July 29, 1958     J. L. BREWSTER ET AL     2,845,318
REINFORCED MOLDED DESK TOPS
Filed Dec. 14, 1956
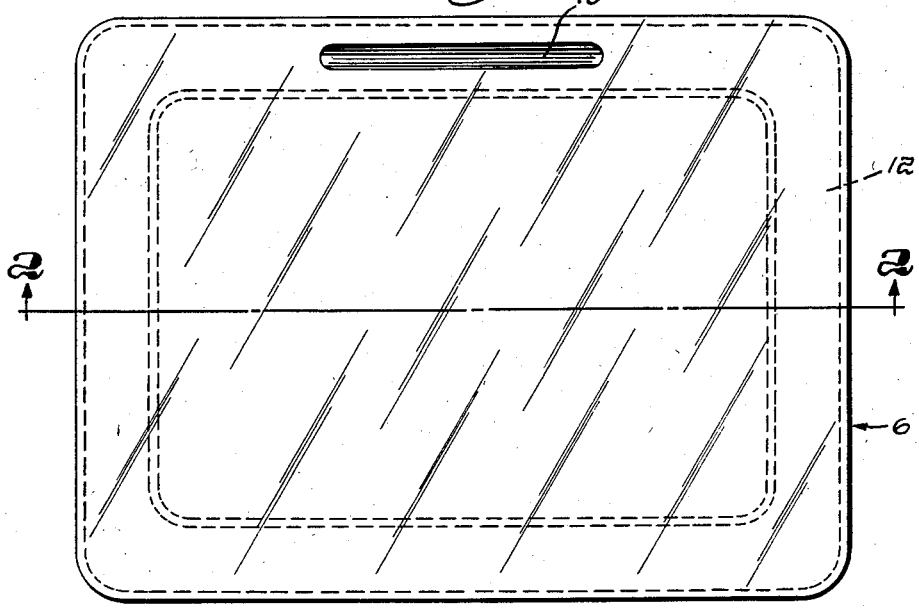
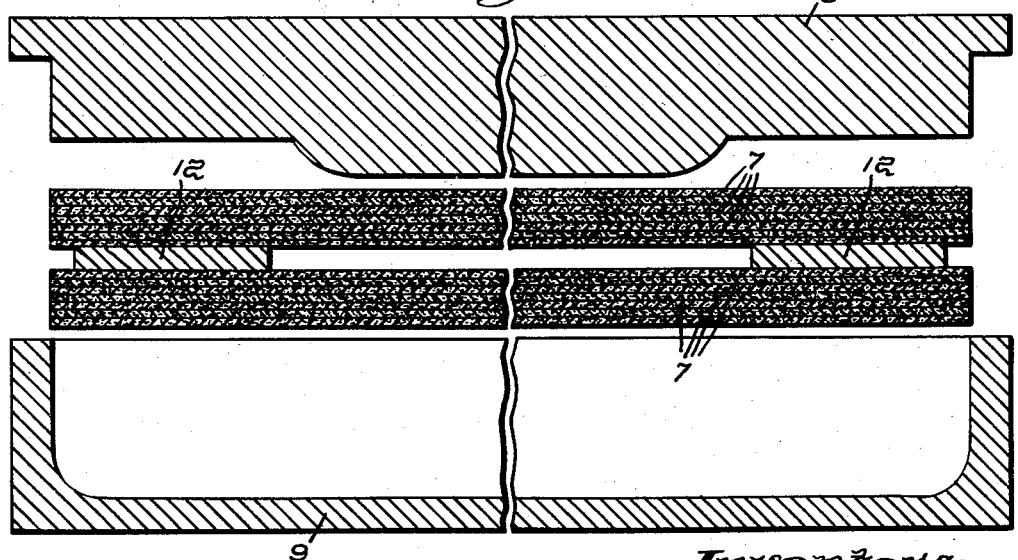
Inventors:
Joseph L. Brewster,
Edmund R. Brown,
Edward F. Elgren, Jr.
Attorney United States Patent Office 2,845,318
Patented July 29, 1958

2,845,318

REINFORCED MOLDED DESK TOPS

Joseph L. Brewster and John Riker Proctor, Camden, and Edward F. Edgren, Jr., Boothbay Harbor, Maine Application December 14, 1956, Serial No. 628,293

4 Claims. (Cl. 311—106)

The present invention relates to plastic tops for tables, desks, and like articles.

The novel features and advantages of articles in accordance with the invention are best illustrated by tops for school desks. School desk tops, made of wood, are a continuing source of expense because their exposed surfaces often become so marred, in the course of a school year, as to require that they be refinished, if not to enable them to be fit for use in the support of written work, at least for the sake of appearance.

While the recognized necessity of refinishing wooden school desk tops from time to time suggests that they be formed from materials that are harder than wood, and hence less easily damaged, initial high cost of substitute materials has resulted in the continued use of wood tops. The general objective of this invention is to provide plastic tops that will be sufficiently hard surfaced to avoid being marred and sufficiently low in cost to be truly competitive with wood.

This objective is attained by providing tops for desks and tables and like articles in the form of a molded body of superimposed glass fibre mats and a thermosetting impregnating resin which bonds together the mats and provides the surfaces. The upper surface of the molded body is flat and its lower surface is mainly flat but has depending supporting portions in which are embedded material extending substantially therethrough, preferably as a frame, and spaced from the top and bottom and from the inner and outer edges thereof a distance approximately equal to the thickness of the top interiorly of said portions. That material may be any low cost stock that is relatively light in weight and difficult to fracture in comparison with the stock of which the body is formed.

In the accompanying drawings, there is shown an illustrative embodiment of the invention from which its novel features and advantages will be readily apparent.

In the drawings:

Fig. 1 is a top plan view of a school desk top in accordance with the invention, Fig. 2 is a section along the indicated lines 2—2 of Fig. 1, and Fig. 3 is a somewhat schematic view illustrating the molding of the desk top.

The school desk top 6 shown in the drawings, is formed by molding, under suitable pressure, an assembly of superimposed glass fibre mats 7 impregnated with a thermosetting plastic between mold members 8 and 9.

The upper surface of the desk top 6 is flat and has, adjacent one edge, a groove 10 shaped and dimensioned to retain a pencil, and while the central part of the under surface is flat, it includes depending marginal supporting portions 11 within which is embedded material shown as a frame 12 dimensioned and arranged so that it is spaced from the upper and lower surfaces of the portions 11 and from the inner and outer edges thereof a distance approximately equal to the thickness of the top interiorly of its marginal portions. The material may be wood or any other stock that combines low cost with such characteristics as lightness in weight and resistance to fracture when compared with the molded plastic body.

In general, conventional molding techniques are followed in the coating of the mold parts 8 and 9 and in the preparation of the thermo-setting resin including the coloring thereof. In practice, fourteen glass fibre mats are used and these are individually impregnated with a polyester resin which gives suitable characteristics such as a hard surface for the top 6. The frame is located mid way of the assembly and the top and bottom layers may be of different material than the other layers or carry other components determining the characteristics of the surface of the top.

It will be apparent from the foregoing that desk and table tops, in accordance with the invention, are possessed of a suitably hard finish and adequate strength. Because the central part, that is the part bordered by the portions 11, is relatively thin and light in weight, costs are suitably reduced. At the same time, the marginal portions 11 serve as supports and they are adequately dimensioned to receive the attaching screws.

What we therefore claim and desire to secure as Letters Patent is:

1. A top for tables and desks, comprising a molded body of superimposed glass fibre mats and a thermosetting resin impregnating and bonding together said mats and providing the surfaces of said body, the upper surface of said body being flat and the lower surface thereof being flat in its central part and including depending marginal supporting portions and material extending substantially through said marginal portions and spaced from the top and bottom and from the inner and outer edges thereof a distance approximately equal to the thickness of the body interiorly of said portions, said material being in the form of a strip of stock that is relatively light in weight and difficult to fracture compared to the body stock.

2. A top for tables and desks, comprising a molded body, the upper surface of said body being flat and the lower surface thereof being mainly flat but including supporting portions depending with respect thereto, and material extending substantially through said marginal portions and spaced from the top and bottom and from the inner and outer edges thereof a distance approximately equal to the thickness of the body interiorly of said portions, said material being in the form of a strip of stock that is relatively light in weight and difficult to fracture compared to the body stock.

3. A top for tables and desks, comprising a molded body of superimposed glass fibre mats and a thermo-setting resin impregnating and bonding together said mats and providing the surfaces of said body, the upper surface of said body being flat and the lower surface thereof being flat in its central part and including depending marginal supporting portions, and material extending substantially through said marginal portions and spaced from the top and bottom and from the inner and outer edges thereof a distance approximately equal to the thickness of the body interiorly of said portions, said material being in the form of a frame of stock.

4. A top for tables and desks, comprising a molded body of superimposed glass fibre mats and a polyester resin impregnating and bonding together said mats and providing the surfaces of said body, the upper surface of said body being flat and the lower surface thereof being mainly flat and including depending supporting portions, and material extending substantially through said marginal portions and spaced from the top and bottom and from the inner and outer edges thereof a distance approximately equal to the thickness of the body interiorly of said portions, said material being in the form of a strip of stock that is relatively light in weight and difficult to fracture compared to the body stock.

References Cited in the file of this patent

UNITED STATES PATENTS

| | | |
|---|---|---|
| 1,434,420 | Zimmerman | Nov. 7, 1922 |
| 1,916,435 | Ott et al. | July 4, 1933 |
| 2,269,331 | Arborn | Jan. 6, 1942 |
| 2,277,252 | Frey | Mar. 31, 1942 |
| 2,626,846 | Morris | Jan. 27, 1953 |